(12) United States Patent
Yamazaki et al.

(10) Patent No.: US 6,704,455 B1
(45) Date of Patent: Mar. 9, 2004

(54) IMAGE PROCESSING SYSTEM AND IMAGE PROCESSING METHOD

(75) Inventors: Yukiko Yamazaki, Kanagawa (JP); Takahiro Yagishita, Kanagawa (JP); Nekka Matsuura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/085,714

(22) Filed: May 28, 1998

(30) Foreign Application Priority Data

May 29, 1997 (JP) .............................................. 9-156007
May 29, 1997 (JP) .............................................. 9-156008

(51) Int. Cl.[7] .................................................. G06K 9/36
(52) U.S. Cl. ........................ 382/251; 382/248; 382/240
(58) Field of Search ................................ 382/232, 233, 382/240, 248, 250–251

(56) References Cited

FOREIGN PATENT DOCUMENTS

| JP | 7-74959 | 3/1995 |
|---|---|---|
| JP | 7-87327 | 3/1995 |
| JP | 7-95579 | 4/1995 |

*Primary Examiner*—Leo Boudreau
*Assistant Examiner*—Ishrat Sherali
(74) *Attorney, Agent, or Firm*—Oblon, Spivak, McClelland, Maier & Neustadt, P.C.

(57) ABSTRACT

A dividing portion divides input image data into a plurality of block data, a block expressed by each of said plurality of block data comprising a pixel matrix of the same predetermined size. A transform portion transforms each of the plurality of block data by a frequency transform method so as to produce a transform factor. A quantizing portion, having a plurality of quantization tables, quantizes the transform factor using one of the plurality of quantization tables. An encoding portion encodes an output of the quantizing portion. A reverse transform portion restores image data from the output of the quantizing portion. A measuring portion measures an error between the input image data and the image data restored by the reverse transform portion. The quantizing portion quantizes the transform factor again using another one of the plurality of quantization tables when the error measured by the measuring portion exceeds a predetermined threshold value.

5 Claims, 11 Drawing Sheets

PATTERN 1

FIG.4B

PATTERN 2

FIG.4C

PATTERN 3

| NAME OF IMAGE AREA | THE NECESSARY AND SUFFICIENT NUMBER OF BITS | | | | THE CHANGED NUMBER OF BITS | | | |
|---|---|---|---|---|---|---|---|---|
| | LL | LH | HL | HH | LL | LH | HL | HH |
| SMOOTH | 8 | 5 | 5 | 5 | 8 | 3 | 3 | 3 |
| INTERMEDIATE | 5 | 7 | 7 | 7 | 5 | 5 | 5 | 5 |
| EDGE | 5 | 9 | 9 | 9 | 5 | 7 | 7 | 7 |

UNIT : BIT

GAIN=2.0

FIG. 12B

GAIN=1.0

FIG. 12C

GAIN=0.5

$$\text{THRESHOLD VALUE} = \frac{\text{THRESHOLD VALUE AT GAIN}=1}{\text{GAIN}}$$

FIG. 13C

NATURAL EDGE AREA

FIG. 13B

NON-EDGE AREA

FIG. 13A

EDGE AREA

IMAGE PROCESSING SYSTEM AND IMAGE PROCESSING METHOD

BACKGROUND OF THE INVENTION

1. Field of the Invention

The present invention relates to an image processing system and an image processing method, and, in particular, to an image processing system and an image processing method using a sub-band encoding method.

2. Descriptions of the Related Art

As an image processing technique in the related art, a technique relating to an image coding device is disclosed in Japanese Laid-Open Patent Application No. 7-87327. In this technique, image data is divided into a plurality of block data, the block expressed by each of the plurality of block data having the same predetermined size. Then, for each of the plurality of block data, a quantizer suitable for the characteristics of each of the plurality of block data, for example, the dynamic range of each of the plurality of block data, is used. Each quantizer has a fixed quantization table.

However, in the above-described technique, a high compression efficiency cannot be achieved as a whole.

In an image forming apparatus such as a copy machine or a printer, image data obtained through a scanner undergoes gamma correction or a filtering process so that the image quality is adjusted. The thus-processed image data is stored in a memory, and then the image data is sent to a printing unit.

Generally, such image data undergoes a data compression so that a capacity of the memory can be reduced, which memory stores the processed image data. Generally, in a data compressing method, image data is transformed into frequency components by using an orthogonal transform such as the discrete cosine transform (DCT), and the quantized image data undergoes an entropy encoding.

The variance of the high-frequency components of the transform factors obtained as a result of image data undergoing frequency transform varies in accordance with a magnitude of change in edge degree of the image. Thus, the image quality is improved when a quantizing method is changed in accordance with a type of an image area to be processed.

Japanese Laid-Open Patent Application No. 7-74959 discloses a technique in which a quantization table is changed based on a transform factor obtained as a result of the orthogonal transform being performed on original image data for each of a plurality of block data so that the image quality matches the contents of the image data and a compression rate is improved.

When an image is printed through a copy machine, a character image area and a line image area can be well recognized by causing the tone slope of a contour of the characters or the lines to be steep.

On the other hand, when an image having a gentle tone slope such as a photograph or the like is printed, a random change in the tone having a small amplitude is sensed as a noise. Thus, it is preferred for such a photographic image to reduce the tone slope of an output image. Particularly, in a halftone photographic image, a better image quality can be obtained by reducing the tone slope even for an area having a steep tone slope.

Accordingly, an edge area corresponding to a character image area or a line image area is separated from a halftone image area and a gentle tone slope area of a photographic image so that the edge area undergoes a differential filtering process whereas the photographic image undergoes a smoothing filtering process. Additionally, when an image data compression is performed, another separation of image areas is performed in accordance with degrees of the tone slope in edge areas.

As mentioned above, in the technique in the related art, two separation processes are performed on the same image data and the filtering process is performed separately from the quantizing process. Thus, there is a problem that a process time is increased and a hardware cost is increased.

Additionally, there is a disadvantage, in the technique disclosed in the above-mentioned patent document, that a compression rate is not maximized since a result of the area separation must be also stored as the compressed data.

SUMMARY OF THE INVENTION

An object of the present invention is to provide an image processing system and an image processing method which enable quantization through which an image quality of input image data is substantially maintained as a result of using a quantization table, for each of a plurality of block data, which table is suitable for the characteristics of the one of the plurality of block data without determining image areas (for example, determining which one of an image area of characters or lines, an image area of a photograph, or an intermediate image area the one of the plurality of block data belongs to).

Specifically, this object of the present invention is to provide the following image processing system and image processing method.

In the image processing system and image processing method, quantization is performed using a quantizer on each of the plurality of block data, a block expressed by each of the plurality of block data having the same predetermined size, which is obtained as a result of an image of the input image data being divided. Then, whether or not the thus-used quantizer is suitable for the image of the input image data is determined using image data restored from the thus-quantized data. Then, if the result of the determination is that the thus-used quantizer is not suitable for the image of the input image data, another quantizer is used for again quantizing the input image data. Thus, it is possible to perform optimum quantization for each of the plurality of block data.

Another object of the present invention is to provide the following image processing system and image processing method.

In the image processing system and image processing method, the image of input image data is divided into a plurality of band data, a band expressed by each of the plurality of band data having the same predetermined size. Then, for each of the plurality of band data, a frequency transformation is performed on the image data so that a transform factor is obtained for each of the plurality of block data of the one of the plurality of band data. Then, statistics of frequency components of the transform factors are taken and variances of the frequency components of the transform factors are calculated for each of the plurality of band data. The optimum numbers of bits for expressing the image data are determined for each of the plurality of band data by using the thus-obtained variances for the one of the plurality of band data. Then, based on the thus-determined numbers of bits, quantization is performed on each of the plurality of band data. Thus, it is possible to perform an optimum quantization for each of the plurality of band data.

Another object of the present invention is to provide an image processing system and an image processing method in which a filtering process and a data compressing process are concurrently performed so that a process time is reduced with a reduced cost.

There is provided according to the present invention an image processing system comprising:

dividing means for dividing input image data into a plurality of block data, a block expressed by each of the plurality of block data comprising a pixel matrix of the same predetermined size;

transform means for transforming each of the plurality of block data using a frequency transform method so as to produce a transform factor;

quantizing means, having a plurality of quantization tables, for quantizing the transform factor using one of the plurality of quantization tables;

encoding means for encoding the output of the quantizing means;

reverse transform means for restoring image data from the output of the quantizing means; and measuring means for measuring an error between the input image data and the image data restored by the reverse transform means, wherein the quantizing means quantizes the transform factor again using another one of the plurality of quantization tables when the error measured by the measuring means exceeds a predetermined threshold value.

In this arrangement, it is not necessary to determine which one of different image areas each of the plurality of block data belongs to. Without performing the above-mentioned determination, it is possible to use the quantization table suitable for the characteristics of the one of the plurality of block data and to perform quantization through which the quality of the input image is substantially maintained.

There is provided according to another aspect of the present invention an image processing system comprising:

dividing means for dividing input image data into a plurality of band data, a band expressed by each of the plurality of band data having the same predetermined size, and then, dividing each of the plurality of band data into a plurality of block data, a block expressed by each of the plurality of block data having the same predetermined size;

transform means for transforming each of the plurality of block data using a frequency transform method so as to produce a transform factor including different types of frequency components, for each of the plurality of band data;

quantizing means for measuring the variance of each of the types of frequency components of the transform factors for each of the plurality of band data, calculating quantization tables suitable for the measured variances, and quantizing the transform factors using the calculated quantization tables; and encoding means for encoding the output of the quantizing means.

In this arrangement, it is possible to perform quantization through which the quality of the input image is substantially maintained.

The quantizing means may measure the variances of the frequency components of the transform factors of the previously quantized ones of the plurality of band data as well as of the currently quantized one of the plurality of band data.

Thereby, for a lower one of the plurality of band data, an extent for which each variance is measured is wider. As a result, for a lower one of the plurality of band data, it is possible to use the quantization table more suitable for the characteristics of the input data of the entire image. For the last one of the plurality of band data, the quantization table obtained from calculation using the variances calculated using the data of the entire image is used. Thereby, it is possible to perform quantization through which the quality of the input image can be substantially maintained.

Further, it is possible to change the calculated quantization tables.

Thereby, it is possible to perform quantization in accordance with a user's requirement or wish in the case where it is required to obtain a high-quality restored image although a time required for outputting the image is long, or in the case where it is required to obtain a restored image quickly although the quality of the image is not high.

There is provided according to another aspect of the present invention an image processing system comprising:

dividing means for dividing image data into a plurality of n-by-m pixel matrix block data, where n and m are natural numbers;

transform portion means for transforming the respective pixels in each of the plurality of n-by-m pixel matrix block data using a frequency transform method so as to produce a transform factor;

quantizing means for quantizing the transform factor;

encoding means for encoding the output of the quantizing means using an entropy encoding method;

edge degree calculating means for calculating a slope of rate of change in tone in the one of the plurality of block data based on the transform factor thereof; and gain changing means for changing the gain of the quantizing means based on the slope calculated by the edge degree calculating means.

In this arrangement, as a result of the gain changing means changing the gain of the quantizing means in accordance with the slope of rate of change in tone calculated by the edge degree calculating means, it is possible to concurrently perform an area separating process and a filtering process for adjusting the quality of an image during a process of data compression. As a result, it is possible to reduce the process time and reduce the costs of the system.

The gain changing means may increase the gain of the quantizing means when the slope calculated by the edge degree calculating means is steep.

In this arrangement, the gain of the quantizing means is changed in accordance with the tone slope in each block, and thereby, it is possible to perform quantization and encoding suitable for the characteristics of the image.

The quantizing means may determine a plurality of ranges into which the transform factor falls, the ranges being defined by a plurality of threshold values, the quantizing means may output a quantization representative value assigned to each of the ranges, and the gain changing means may change the gain of the quantizing means by changing the threshold values.

In this arrangement, because the quantization representative value is fixed even when the gain of the quantizing means is changed as an image area is changed, it is not necessary to store, as compressed data, data indicating the used quantization table, when the quantized data is encoded. Thereby, the compression efficiency is improved.

Additionally, when a difference between the two slopes of adjacent pixel blocks exceeds a predetermined value, the edge degree calculating portion may change a smaller one of the two slopes to be a further smaller value.

In this arrangement, image information of an image area for which it is difficult to visually recognize the accurate change in tone is reduced. Thereby, it is possible to improve the compression rate without causing image degradation to be recognized.

Further, the transform factor may be represented by a plurality of components each having one or a plurality of factors, and the edge degree calculating portion may select a maximum value of the absolute values of the factors as a representative value of each component so as to calculate the slope as a difference between the maximum representative value and the second maximum representative value.

In this arrangement, it is possible to change the edge degree of an image area, for which no problem occurs when the tone slope is smoothed, into a smaller value. Thereby, it is possible to improve the compression rate without causing image degradation to be recognized.

Other objects and further features of the present invention will become more apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
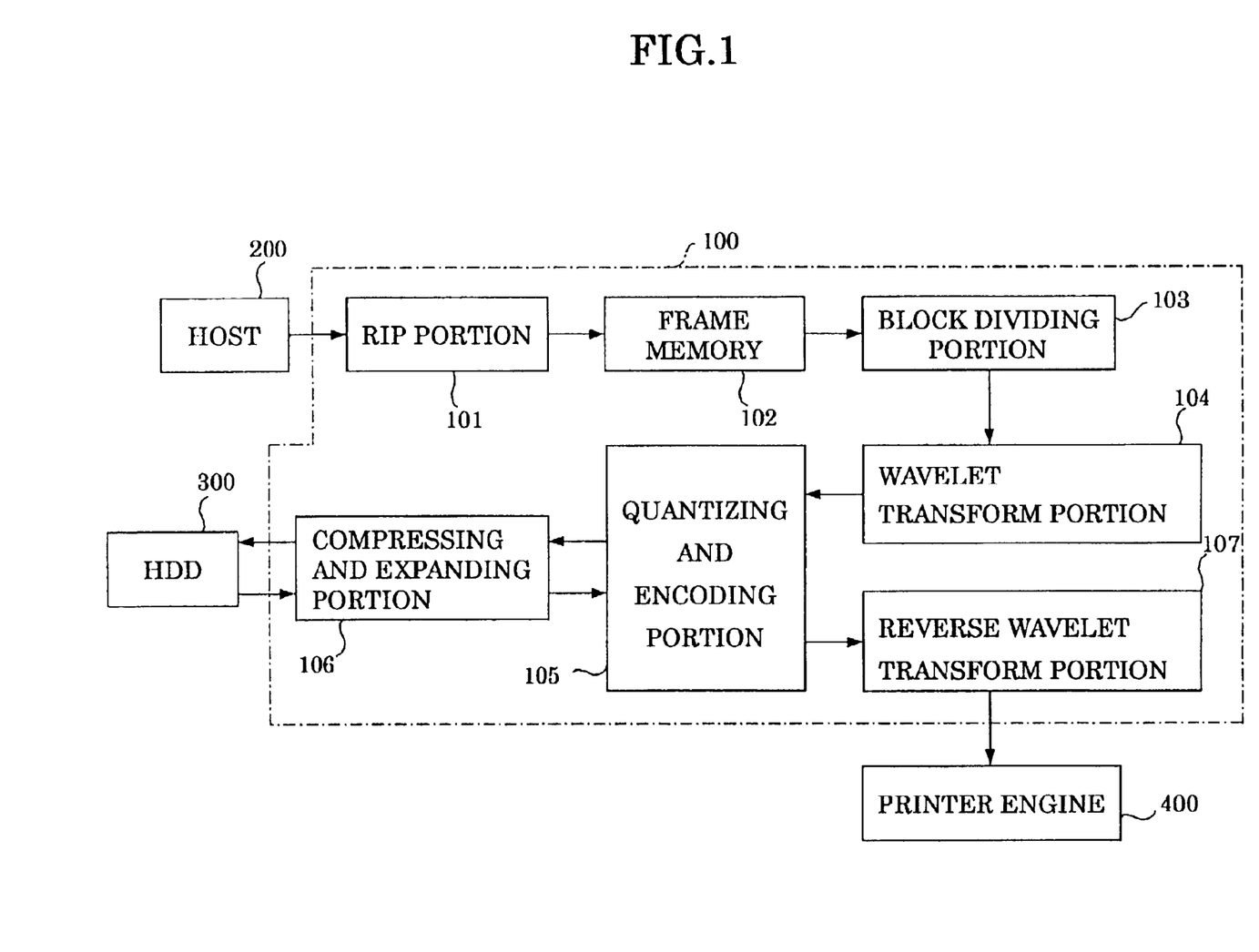
FIG. 1 is a block diagram of a printer system which is an image processing system according to each of first, second, third and fourth embodiments of the present invention.

A description will be given, with reference to FIGS. 1 through 7, of first, second, third and fourth embodiments of the present invention. FIG. 1 is a block diagram of a printer system which is an image processing system generally according to each of the first through fourth embodiments of the present invention.

The printer system shown in FIG. 1 comprises an image processing unit 100, a host unit 200 such as a personal computer, a hard disc drive unit (HDD) 300 as a large capacity memory portion and a printer engine 400.

The image processing unit 100 comprises an RIP portion 101, a frame memory 102 (first storage portion), a block dividing portion 103, a wavelet transform portion 104, a quantizing and encoding portion 105, a compressing and expanding portion 106, and a reverse wavelet transform portion 107.

A description will now be given of an operation of the above-mentioned components of the printer system shown in FIG. 1.

Page-description data provided from the host unit 200 is transformed into bit-map data through the RIP portion 101, and the bit-map data is stored in the frame memory 102. The page of the bit-map data developed in the frame memory 102 is sent to the block dividing portion 103 which then divides the thus-sent page of bit-map data into a plurality of block data, the block expressed by each of the plurality of block data having the same predetermined size. The thus-obtained block data is transferred to the wavelet transform portion 104. The wavelet transform portion 104 performs the wavelet transformation on each of the plurality of block data and thus provides data (transform factor) for each of the plurality of block data. The thus-obtained transform factors for the plurality of block data undergo a quantizing process through the quantizing and encoding portion 105. The quantized data is transferred to the compressing and expanding portion 106. The compressing and expanding portion 106 includes a buffer memory having a small storage capacity. Using the buffer memory, the compressing and expanding portion 106 performs data compressing such as the QM-coder or the like on the quantized data. The compressed data is sequentially written in the HDD 300 (second storage portion). The compressed data stored in the HDD 300 is read upon request, and is supplied to the compressing and expanding portion 106 which then expands the compressed data. Then, the expanded data is returned to the transform factors through the quantizing and encoding portion 105. Then, the transform factors undergo the reverse wavelet transform process through the wavelet reverse transform portion 107. Thereby, image data is produced and is printed out through the printer engine 400.

Figure 2:
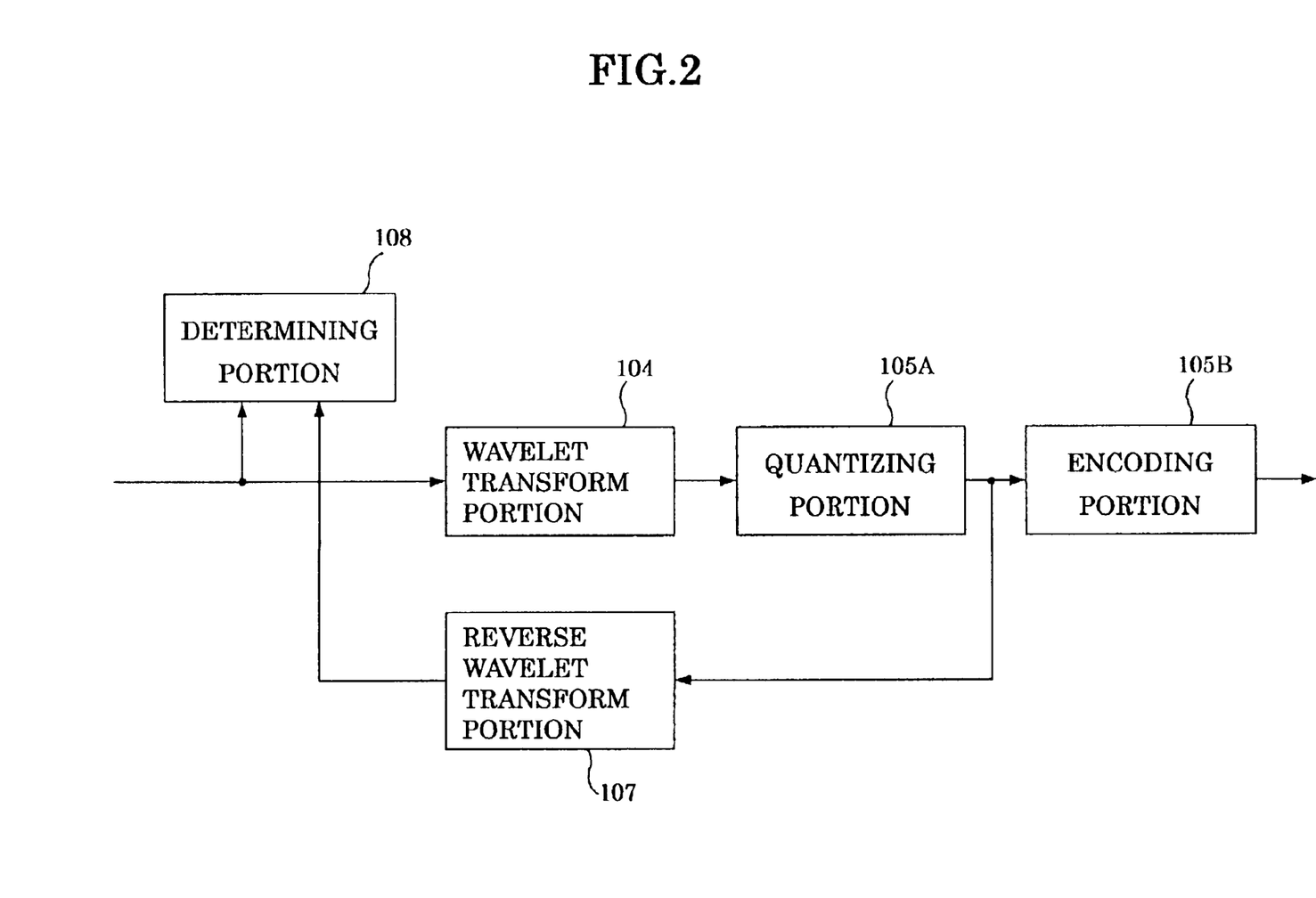
FIG. 2 shows a block diagram of a portion of an image processing unit shown in FIG. 1, the image processing unit according to the first embodiment of the present invention including the portion shown in FIG. 2.

FIG. 2 shows a block diagram of a portion of the image processing unit shown in FIG. 1. The image processing unit 100 according to the first embodiment of the present invention includes the portion shown in FIG. 2. In the arrangement shown in FIG. 2, the quantizing and encoding portion 105 is separated into a quantizing portion 105A and an encoding portion 105B. Further, in addition to the arrangement shown in FIG. 1, a determining portion 108 is provided in the image processing unit 100.

Figure 3A:
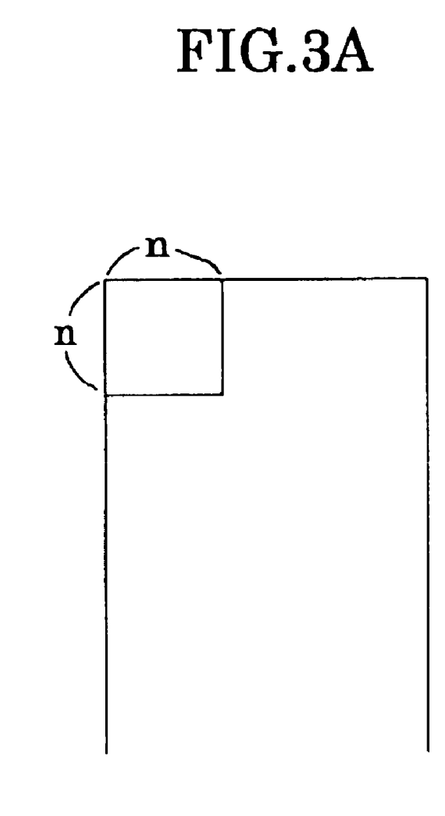
FIG. 3A illustrates an example of dividing of input image data into a plurality of block data, a block expressed by each of the plurality of block data having the same predetermined size.
Figure 3B:
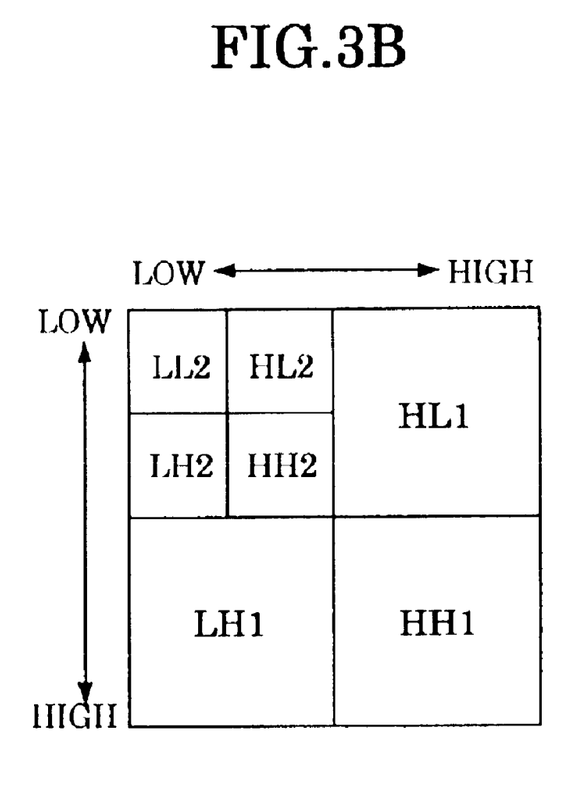
FIG. 3B illustrates a transform factor obtained as a result of performing a frequency transformation.

Input image data transformed to bit-map data through the RIP portion 101 is sent to the block dividing portion 103 via the frame memory 102. The block dividing portion 103 divides the bit-map data into a plurality of n-by-n pixel matrix block data, as shown in FIG. 3A, which is then transferred to the wavelet transform portion 104. In the wavelet transform portion 104, each of the plurality of block data is transformed into the transform factor from the high-frequency component through the low-frequency component in $\log_2 n$ levels. FIG. 3B shows the frequency components of the transform factor for one of the plurality of block data in a case where n=4. That is, FIG. 3B shows the result of the wavelet transformation in two levels being performed on one of the plurality of block data.

Figure 4A:
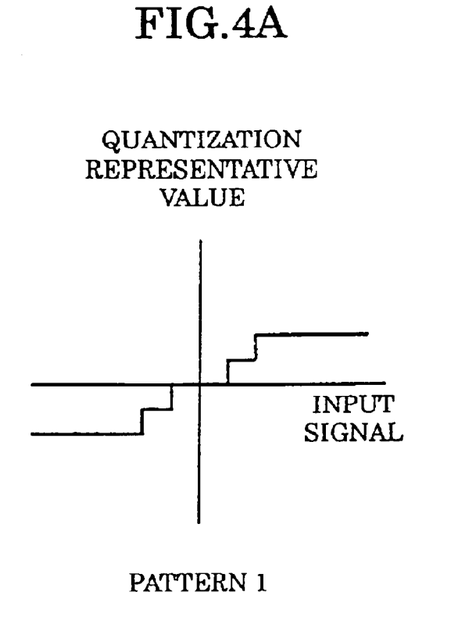
FIGS. 4A, 4B and 4C illustrate an example of a plurality of quantization tables used in the first embodiment of the present invention.
Figure 4B:
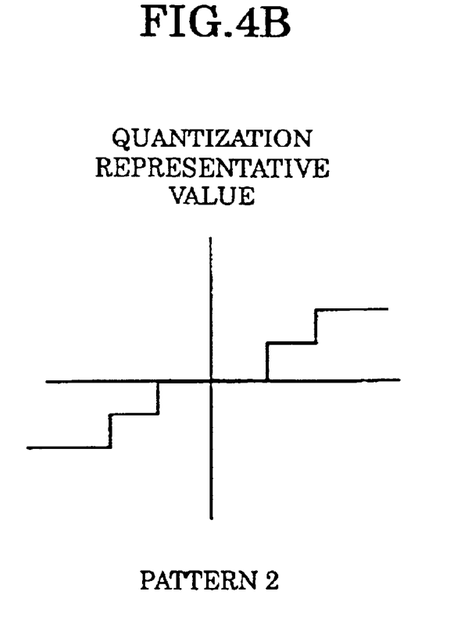
Figure 4C:
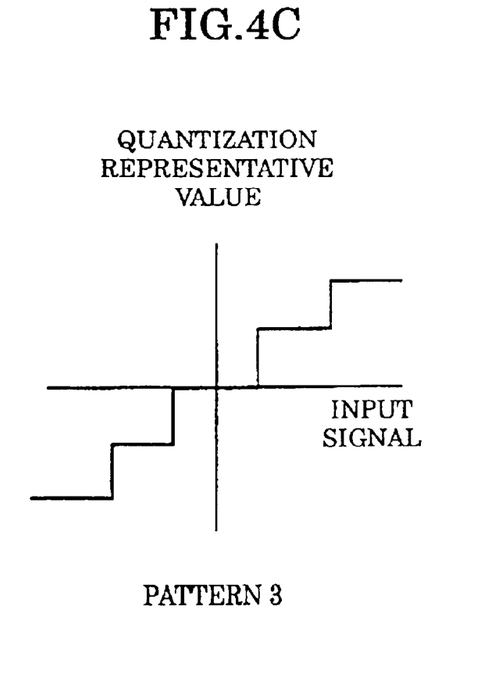

Each of the transform factors obtained from the wavelet transformation being thus performed on the plurality of block data is quantized by using a quantization table. In this embodiment, it is assumed that three patterns are prepared as the quantization tables, as shown in FIGS. 4A, 4B and 4C. Each pattern has five levels as shown in the figures. For various characteristics of image areas, the three patterns are prepared. In the pattern 1 shown in FIG. 4A, each of the step heights is small. In the pattern 3 shown in FIG. 4C, each of the step heights is large. In the pattern 2 shown in FIG. 4B, each of the step heights is intermediate. The pattern 1 is suitable as the quantization table for an image area in which tone changes smoothly. The pattern 3 is suitable as the quantization table for an image area including edges (where tone changes steeply) such as those of characters or the like. The pattern 2 is suitable as the quantization table for an image area having characteristics intermediate between those of the image area of smooth tone change and those of the image area including edges. When each of the plurality of block data is quantized, the quantization table of the pattern 2 is used first.

The thus-quantized data is output from the quantizing portion 105A and is returned to image data through the reverse wavelet transform portion 107 (see FIG. 2).

The image data obtained through the reverse wavelet transform portion 107 is input to the determining portion 108. The determining portion 108 calculates the mean square error between the image data obtained through the reverse wavelet transform portion 107 and the original input image data, for the respective pixels. Thus, the determining portion 108 determines whether or not the quantization table (pattern 2 shown in FIG. 4B in this case) is suitable for the original input image data. The determining portion 108 determines that the quantization table is suitable for the input original image data when the calculated mean square error has a value lower than a predetermined threshold value. When the determining portion 108 determines that the quantization table is suitable for the input image data, the quantized data is sent to the encoding portion 105B. At this time, in the encoding portion 105, codes (0, 1, 2, sign (+/−) bit) are used for expressing the five quantization levels of the quantization table (pattern) having the middle step heights shown in FIG. 4B (pattern 2) in this case.

When it is determined by the determining portion 108 that the quantization table is not suitable for the original input image data and the image data values of the entire image data increase, that is, the tone levels of the image expressed by the entire image data increase, as a result of the quantization using the quantization table (pattern 2 in this case), another quantization table (pattern) which has shorter step heights (pattern 1 shown in FIG. 4A in this case) is used instead of the previously used quantization table (pattern 2 in this case). Then, quantization is performed again using the quantization table (pattern) having the shorter step heights. The thus-quantized data obtained through the quantizing portion 105A is sent to the encoding portion 105B. At this time, because the quantization table (pattern 1 in this case) different from the previously used quantization table (pattern 2 in this case) has been used, different codes (3, 4, 5, sign bit) are used for expressing the five levels of the quantization table (pattern 1) in the encoding portion 105B.

When it is determined by the determining portion 108 that the quantization table is not suitable for the original input image data and the data values of the entire image data decrease, that is, the tone levels of the image expressed by the entire image data decrease as a result of the quantization using the quantization table (pattern 2 in this case), another quantization table (pattern) which has longer step heights (pattern 3 shown in FIG. 4C in this case) is used instead of the previously used quantization table (pattern 2 in this case). Then, quantization is performed again using the quantization table (pattern) having the longer step heights. The quantized data obtained through the quantizing portion 105A is sent to the encoding portion 105B. At this time, because the quantization table (pattern) different from the previously used quantization table (pattern 2 in this case) has been used, different codes (6, 7, 8, sign bit) are used for expressing the five levels of the quantization table (pattern 3) in the encoding portion 105B.

On the decoding and reverse quantization side, because the quantization table which was used can be determined by referring to the codes expressing the five levels of the quantization table, decoding and reverse quantization can be appropriately performed so as to return the quantized and encoded data to image data.

Figure 6:
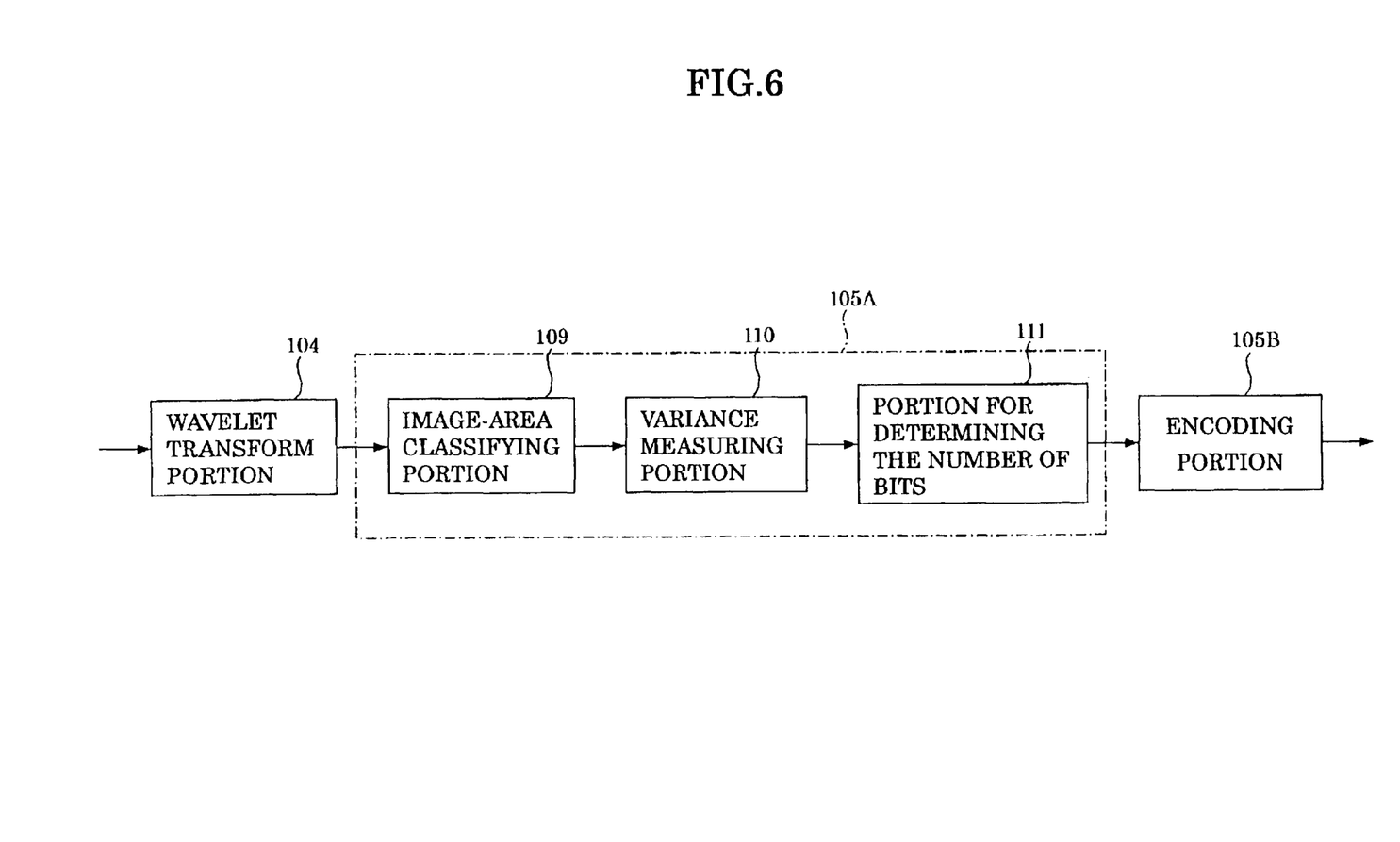
FIG. 6 is a block diagram of a portion of the image processing unit shown in FIG. 1, the image processing unit according to the second embodiment of the present invention including the portion shown in FIG. 6.

FIG. 6 is a block diagram of a portion of the image processing unit 100 shown in FIG. 1. The image processing unit 100 according to the second embodiment of the present invention includes the portion shown in FIG. 6. In the arrangement of FIG. 6, the quantizing and encoding portion 105 is separated into a quantizing portion 105A and an encoding portion 105B. Further, the quantizing portion 105A includes an image-area classifying portion 109, a variance measuring portion 110, and a portion for determining the number of bits 111.

Figure 5:
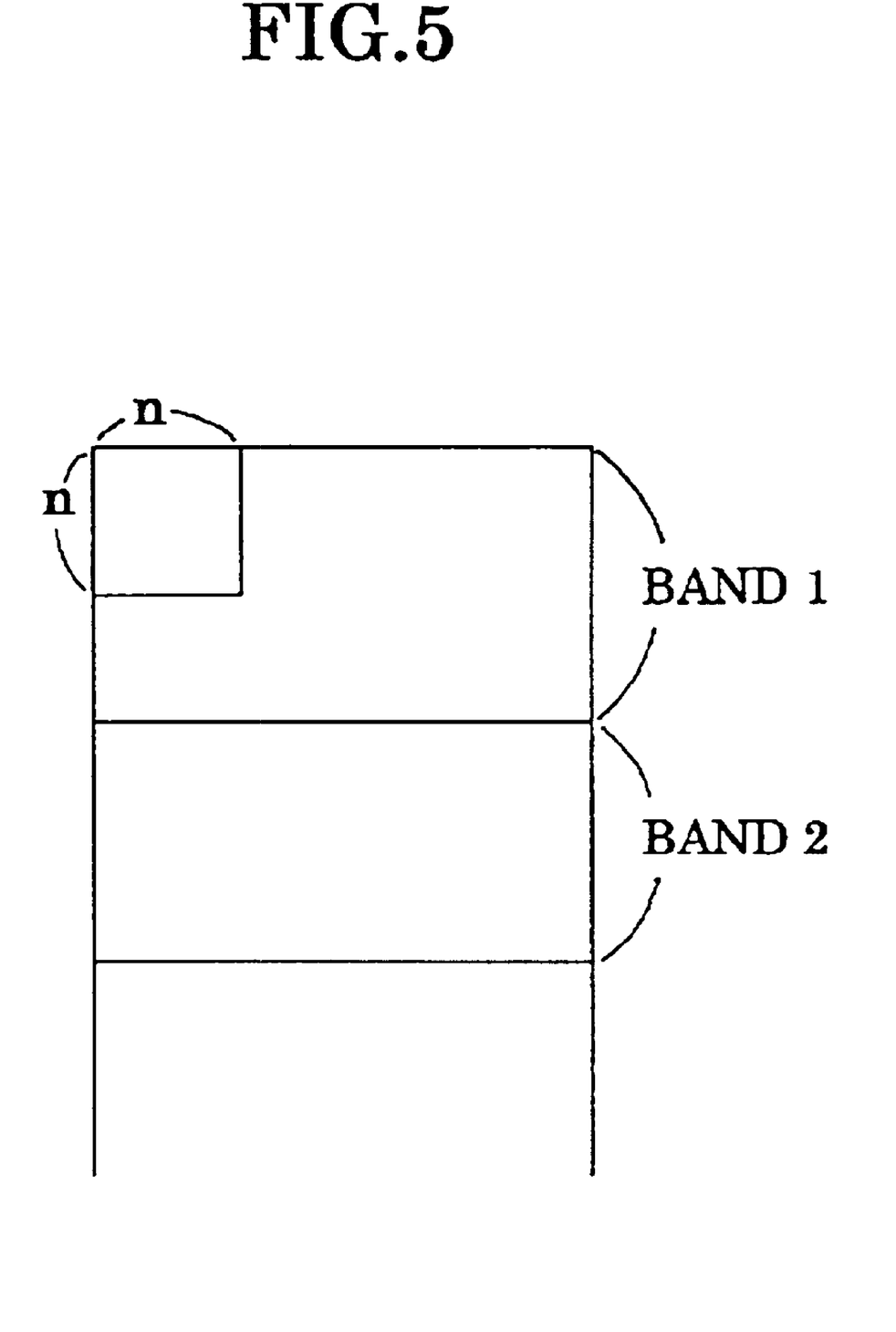
FIG. 5 illustrates an example of dividing of input image data into a plurality of band data, a band expressed by each of the plurality of band data having the same predetermined size.

In the second embodiment, the input image data transformed to bit-map data is divided into a plurality of band data 1, 2, 3, . . . , the block expressed by each of the plurality of band data having the same predetermined size, as shown in FIG. 5, through the block dividing portion 103. Further, similar to the case in the above-described first embodiment, each of the plurality of band data is divided into a plurality of n-by-n pixel matrix block data by the block dividing portion 103. In the wavelet transform portion 104, each of the plurality of block data is transformed to the transform factor from the high-frequency component through the low-frequency component in $\log_2 n$ levels, as shown in FIG. 3B.

In the quantizing portion 105A, first, the image-area classifying portion 109 classifies the plurality of block data into a plurality of types of image areas. In this case, it is possible to classify the plurality of block data into the plurality of types of image areas using the values of the high-frequency components of the transform factors of the block data. In this case, it is assumed that the plurality of block data is classified into three types of image areas: an edge image area in which the values of the high-frequency components are large, a smooth image area in which tone changes smoothly and the values of the high-frequency components are small, and an intermediate image area having characteristics intermediate between those of the edge image area and those of the smooth image area.

Then, the variance measuring portion 110 measures the variance of each type (HH, LH or HL) of the high-frequency components of the transform factors for each of the above-mentioned three types of image areas for each of the plurality of band data, using the statistics of the type of high-frequency components. Then, based on the thus-measured variances, the portion for determining the number of bits 111 calculates the number of bits for expressing each type of the frequency components of the transform factors for each of the plurality of band data. The number of bits for expressing each type of the frequency components of the transform factors calculated here depends on the characteristics of the input image. For example, it is assumed that the necessary and sufficient number of bits calculated using a respective one of the measured variances for each type (HH, HL or LH) of the high-frequency components of the transform factors of the currently processed one of the plurality of band data for one of the three types of image areas is: 4 bits for HH, 5 bits for HL and 5 bits for LH. Then, the number of bits for each type of the high-frequency components is determined to be the same number: 5 bits, for the sake of convenience in calculation. Here, because it is known that a linear quantization method is suitable for the low-frequency components of the transform factors, measurement of the variance for the low-frequency components of the transform factors is not performed.

Then, the respective high-frequency components of the transform factors are quantized into the number of levels such that each of the high-frequency components can be expressed by 5 bits. For the quantization at this time, the Max quantizer is used for each of the above-mentioned three image areas (the edge image area, the smooth image area and the intermediate image area) for each of the three types of the high-frequency components (HH, HL, LH). Thus, a total of nine Max quantizers are used for each of the plurality of band data. The quantization table of each Max quantizer is a quantization table by which the mean quantization noise power is minimized. Because this quantization table is set so that each of the above-mentioned variances is assumed to be 1, it is necessary to transform the high-frequency components of the transform factors, so that the variance of each type of the high-frequency components of the transform factors is 1, using a normalization factor. Then, the data of the normalization factor and the number of bits (5, in the above-mentioned example) for the quantization are added to the quantized data as a label for each of the types of the high-frequency components of the transform factors for each of the three types of image areas for each of the plurality of band data. Thereby, decoding and reverse quantization of the quantized data can be performed on the decoding and reverse quantization side appropriately. By performing the above-described processes for each of the plurality of band data sequentially, the input data of the entire image can be quantized and encoded, and can be decoded and reverse-quantized.

The third embodiment of the present invention will now be described.

In the third embodiment, similar to the case of the above-described second embodiment, the input image data transformed into bit-map data is divided into a plurality of band data 1, 2, 3, . . . , the band expressed by each of the plurality of band data having the same predetermined size, as shown in FIG. 5. Then, each of the plurality of band data is divided into a plurality of n-by-n pixel matrix block data and each of the plurality of block data is transformed into the transform factor from the high-frequency component through the low-frequency component in $\log_2 n$ levels using the wavelet transform method, as shown in FIG. 3B. Then, for the first one of the plurality of band data (band 1), the variance of each type of the high-frequency components of the transform factor of each of the plurality of block data is measured, and, based on the measured variances, the high-frequency components of the transform factor of each of the plurality of block data are quantized and encoded, respectively. Then, for the second one of the plurality of band data (band 2), the variance of each type of the high-frequency components of the transform factors of the plurality of block data of the second one of the plurality of band data (band 2) and also the corresponding type of the high-frequency components of the transform factors of the plurality of block data of the first one of the plurality of band data (band 1) is measured. Thus, the variance is measured using the data of the first one of the plurality of band data as well as the data of the second one of the plurality of band data. As a result, the value of the variance can be obtained with high accuracy. Processes to be performed after the variances are obtained are similar to those of the case of the above-described second embodiment. The above-described processes are performed on each of the subsequent ones of the plurality of band data. That is, for the third one of the plurality of band data (band 3), the variance is measured using the data of the first and second ones of the plurality of band data as well as the data of the third one of the plurality of band data.

Thus, the process for each one of the plurality of band data is performed sequentially using the data of the ones of the plurality of band data which have been already quantized as well as the data of the currently processed one of the plurality of band data. Thereby, for a lower one of the plurality of band data, an extent for which each variance is measured is wider. As a result, for a lower one of the plurality of band data, it is possible to use the quantization table more suitable for the characteristics of the data of the entire image. For the last one of the plurality of band data, the quantization table obtained from the variances calculated by using the data of the entire image can be used.

In each of the second and third embodiments, in the quantization, the necessary and sufficient number of bits are used for expressing each of the types of the high-frequency components, the number of bits being obtained based on a respective one of the measured variances. In this case, for the above-mentioned smooth image area and intermediate image area, it is possible to reduce the number of bits. Thus, the compression efficiency is increased. However, for the edge image area, it can be considered that the number of bits used in the quantization is a number such that there is not very much point in performing the quantization. In other words, for the edge image area, the necessary and sufficient number of bits may be very large.

In order to increase the compression efficiency, a fixed value ($\alpha$) is subtracted from the number of bits for each of the types of the high-frequency components, which number has been calculated by using a respective one of the measured variances. Thereby, it is possible to perform quantization in consideration of the variance of each of the types of the high-frequency components. For example, it is assumed that a user can select one of conditions in which an image is output. In this case, the conditions in which an image is output include a condition such that a quality of an output image is low although an output speed of the image is high, a condition such that a quality of an output image is high although an output speed of the image is low, and so forth. By determining the fixed value ($\alpha$) which is subtracted from the number of bits for each of the types of the high-frequency components, it is possible to perform efficient quantization suitable for the characteristics of an input image as a result of a user performing selection suitable for the characteristics of the input image.

Figure 7:
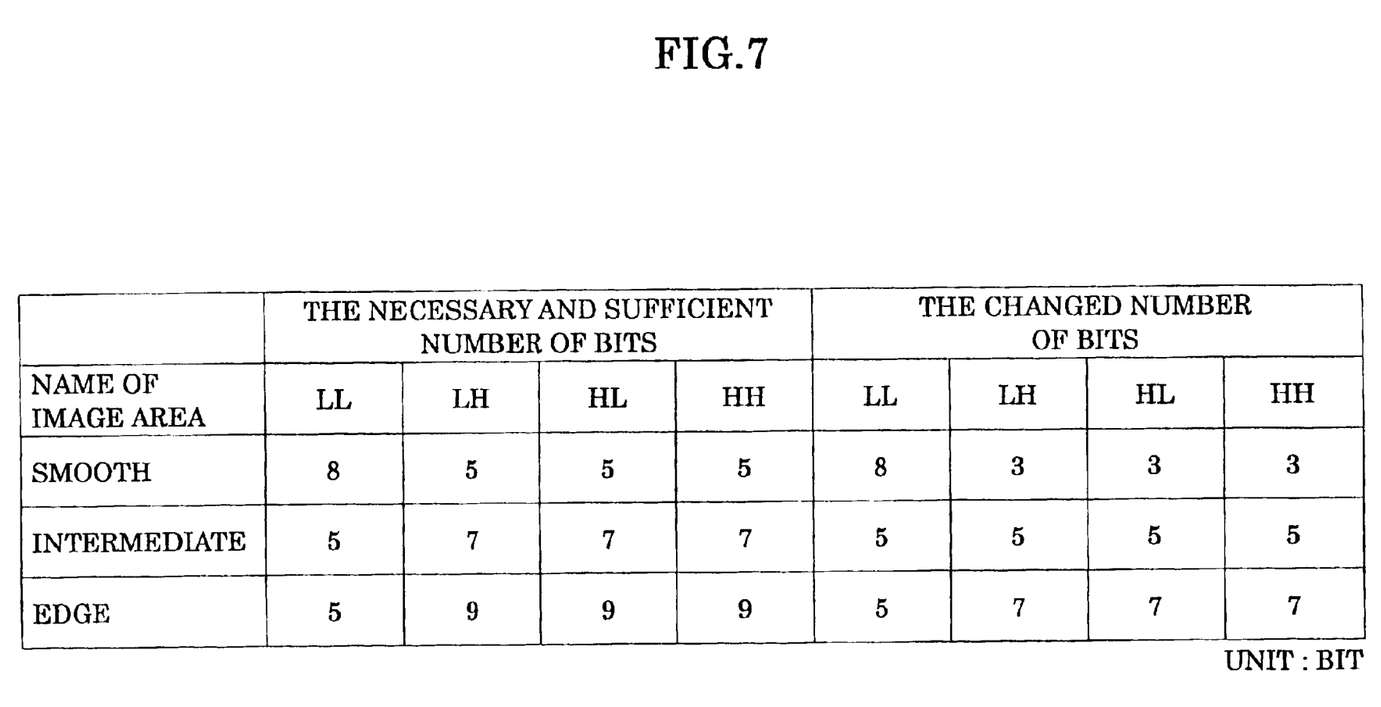
FIG. 7 illustrates an allocation of the number of bits for each type of image area for each type of high-frequency component.

FIG. 7 shows an example of allocation of the number of bits for each of the types of the image areas (smooth image area, intermediate area and edge area) for each of the types of the high-frequency components (HH, LH and HL). For example, when a user selects the condition such that 'a quality of an output image is high although an output speed of the image is low', the allocation of the number of bits for each of the types of the image areas for each of the types of the high-frequency components is changed from the necessary and sufficient number of bits indicated on the left side to the number of bits indicated on the right side, of FIG. 7. In this example, '2' is subtracted from the number of bits for each of the types of the image areas for each of the types of the high-frequency components as a result of the change. When a user selects the condition such that 'a quality of image is low although an output speed of the image is high', a number to be subtracted from the number of bits for each of the types of the image areas for each of the types of the high-frequency components as a result of the change can be more than '2'.

Thus, by enabling change of allocation of the number of bits for each of the types of the image areas for each of the types of the high-frequency components, it is possible to perform quantization in accordance with a user's requirement or wish in the case where it is required to obtain a high-quality restored image although a time required for outputting the image is long, or in the case where it is required to obtain a restored image quickly although the quality of the image is not high.

In each of the above-described first, second, third and fourth embodiments, the wavelet transform method is used as a frequency transform method. However, the frequency transform method used in the present invention is not limited to the wavelet transform method. Another frequency transform method belonging to the sub-band encoding method can be used in the present invention as the frequency transform method. However, the DCT method is not very suitable for the present invention described above.

The above-described functions of the image processing unit 100, shown in FIG. 1, according to each of the first, second, third and fourth embodiment can be performed by a general-purpose computer that is specially configured by software executed therein to carry out these functions.

Figure 8:
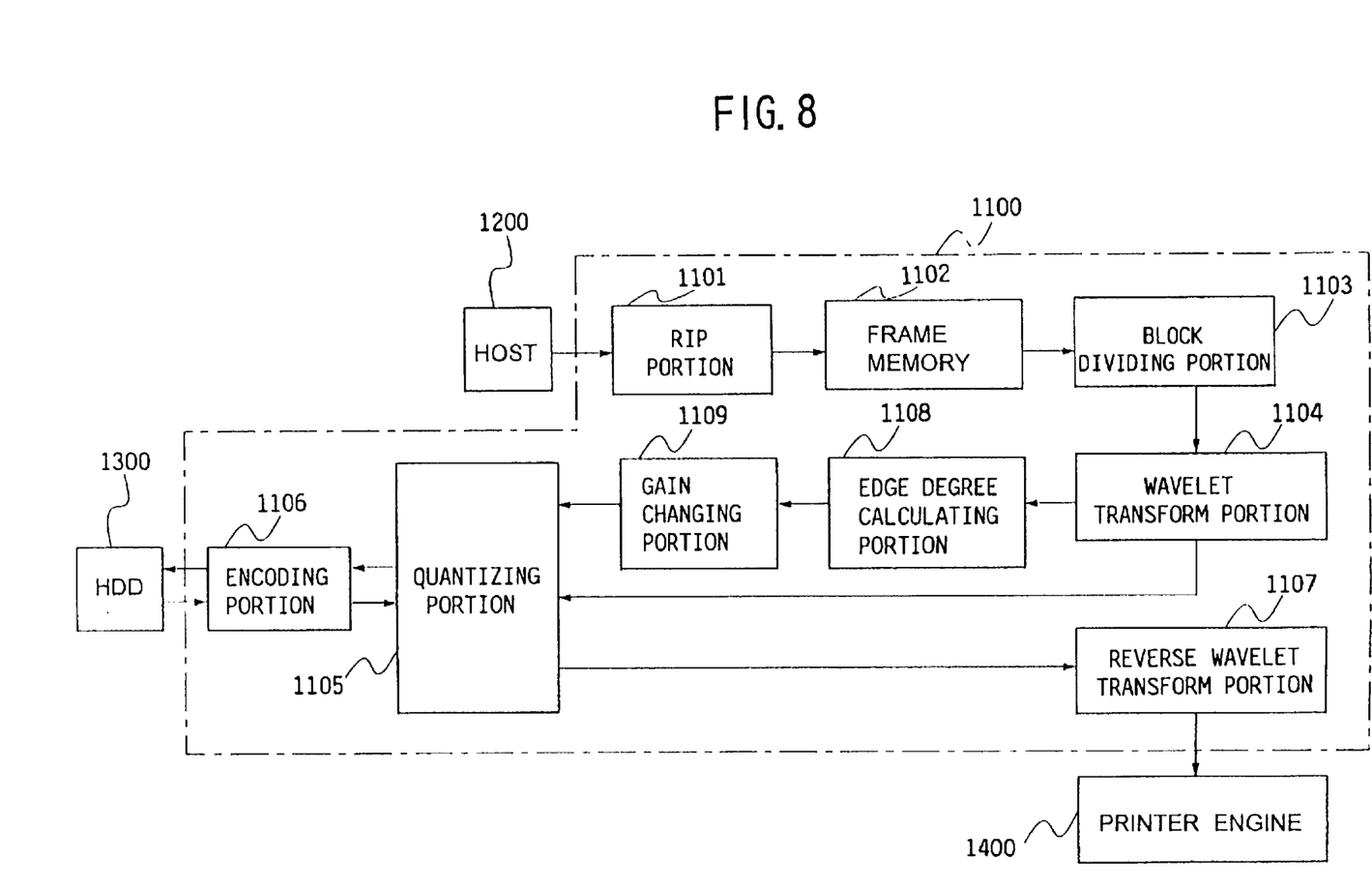
FIG. 8 is a block diagram of an image processing system according to a fifth embodiment of the present invention.

A description will now be given, with reference to FIGS. 8 through 13C, of a fifth embodiment of the present invention. FIG. 8 is a block diagram of a printer system which is an image processing system according to the fifth embodiment of the present invention.

The printer system shown in FIG. 8 comprises an image processing unit 1100, a host unit 1200 such as a personal computer, a hard disc drive unit (HDD) 1300 as a large capacity memory portion and a printer engine 1400.

The image processing unit 1100 comprises an RIP portion 1101, a frame memory 1102, a block dividing portion 1103, a wavelet transform portion 1104, a quantizing portion 1105, an encoding portion 1106, a reverse wavelet transform portion 1107, an edge degree calculating portion 1108 and a gain changing portion 1109.

A description will now be given of an operation of the above-mentioned components of the printer system shown in FIG. 8.

When image data is input from the host unit 1200 to the RIP portion 1101, the RIP portion 1101 transforms the image data to bit-map data and stores the bit-map data in the frame memory 1102. Then, the bit-map data corresponding to a single page is transferred to the block dividing portion 1103. The block dividing portion 1103 divides the bit-map data into a plurality of block data, the block expressed by each of the plurality of block data having the same predetermined size. The block data is sequentially transferred to the wavelet transform portion 1104. The wavelet transform portion 1104 transforms each of the plurality of block data into a transform factor, and sends the transform factor to the quantizing portion 1105 and the edge degree calculating portion 1108. The edge degree calculating portion 1108 calculates a slope of a rate of change in tone in each of the plurality of block data based on the transform factor supplied by the wavelet transform portion 1104. The result of the calculation is output to the gain changing portion 1109. The gain changing portion 109 changes a gain of the quantizing portion 1105 based on the tone slope calculated by the edge degree calculating portion 1108. The quantizing portion 1105 quantizes the transform factor supplied by the wavelet transform portion 1104 by a gain changed by the gain changing portion 1109. The quantized data is transferred to the encoding portion 1106. The encoding portion 1106 is provided with a buffer memory having a small capacity. The encoding portion 1106 performs data compression (encoding) such as the QM-coder or the like by using the buffer memory. The compressed data is sequentially written in the HDD 1300. The compressed data stored in the HDD 1300 is read upon request, and is supplied to the encoding portion 1106. Then, the compressed data is expanded by the encoding portion 1106 by using a reverse encoding method. Thereafter, the quantizing portion 1105 restores the expanded data by a reverse quantizing method, and supplies the transform factor to the reverse wavelet transform portion 1107. Accordingly, the image data is regenerated by the reverse wavelet transform portion 1107, and is output as a visible image by the printer engine 1400.

Figure 9:
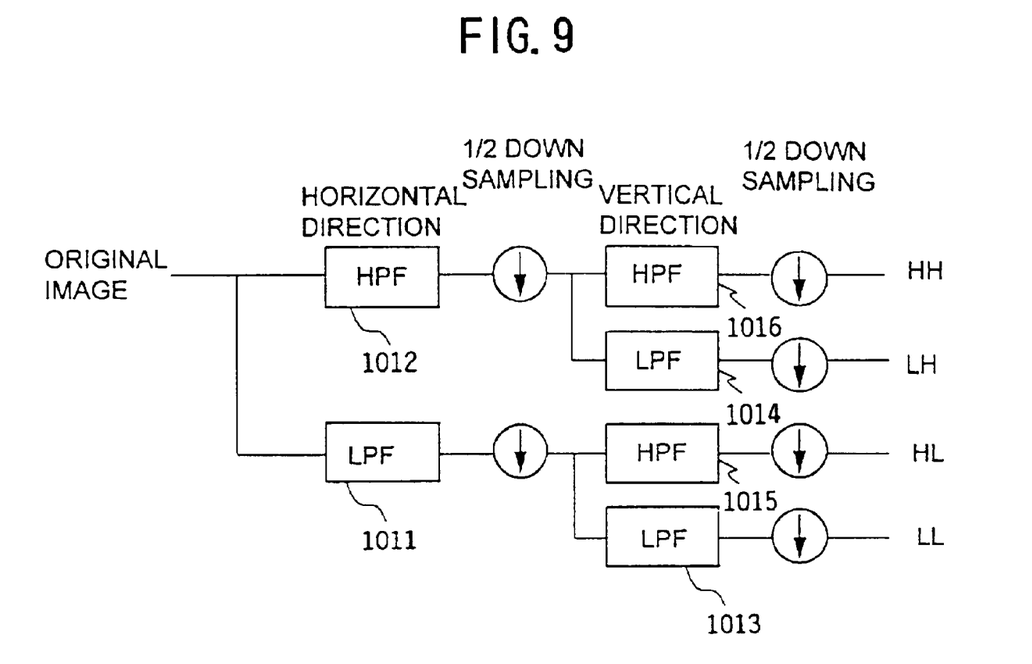
FIG. 9 is a circuit diagram of a wavelet transform portion shown in FIG. 8.

The image processing system according to the fifth embodiment uses a sub-band encoding method for two-dimensional image data. Accordingly, as shown in FIG. 9, the wavelet transform portion 1104 first separates a horizontal direction signal of the original image into a low-frequency signal and a high-frequency signal using a low-pass filter (LPF) 1011 and a high-pass filter (HPF) 1012. Then, a vertical signal of the original image undergoes the similar. process performed by low-pass filters 1013 and 1014 and high-pass filters 1015 and 1016. Thus, the original image data is separated into four bands, which are, a horizontal high-band (HL), a vertical high-band (LH), a diagonal high-band (HH) and a low band (LL) as shown in FIG. 10.

Figure 10:
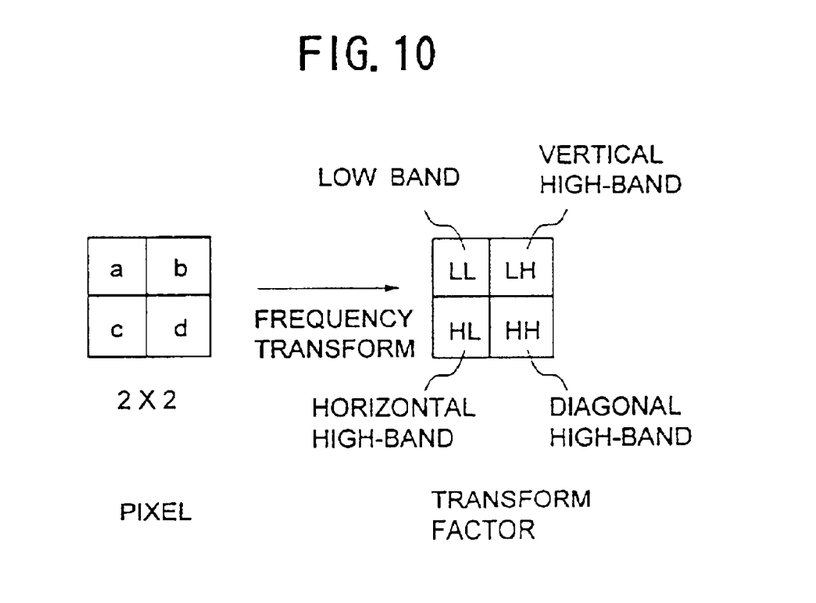
FIG. 10 is an illustration for explaining a pixel block and a frequency transform factor.

When the band separation is performed, the original image is divided into a plurality of 2-by-2 pixel matrix blocks as shown in FIG. 10. That is, each pixel block is formed of two pixels (in the horizontal direction) by two pixels (in the vertical direction). First, the pixels in the pixel block undergo (2, 2) transformation in the horizontal direction based on the following equation (1). In this operation, an LPF output s(n) and an HPF output d(n) are obtained. Thereafter, each of the outputs undergoes (2, 2) transformation in the vertical direction so that the transform factor shown in FIG. 10 is obtained. The horizontal high-band HL represents a high-frequency component of the original image in the horizontal direction. The vertical high-band LH represents a high-frequency component in the vertical direction. The diagonal high-band HH represents a high-frequency component in a diagonal direction. The low band LL represents a low-frequency component.

It should be noted that the original image may be divided into 4-by-4 matrix pixel blocks. In such a case, each of the components (HL, LH, HH, LL) includes four components.

The transform factor is restored to image data by (2, 2) reverse transformation based on the following equation (2) after undergoing a quantizing process, an entropy encoding process and a reverse quantizing process described later.

"(2, 2) transform"

$$LPF:\ s(n)=[\{X(2n)+X(2n+1)\}/2]$$

$$HPF:\ d(n)=X(2n)-X(2n+1) \quad (1)$$

"(2, 2) reverse transform"

$$X(2n)=s(n)+[(d(n)+1)/2]$$

$$X(2n+1)=s(n)-[d(n)/2] \quad (2)$$

Generally, a probability density function of high-frequency factors is approximated by the Laplacian distribution having a mean value of 0. Thus, the quantizing portion 1105 performs a non-linear quantization on high-frequency factors so as to minimize the mean quantization noise power.

Figure 11:
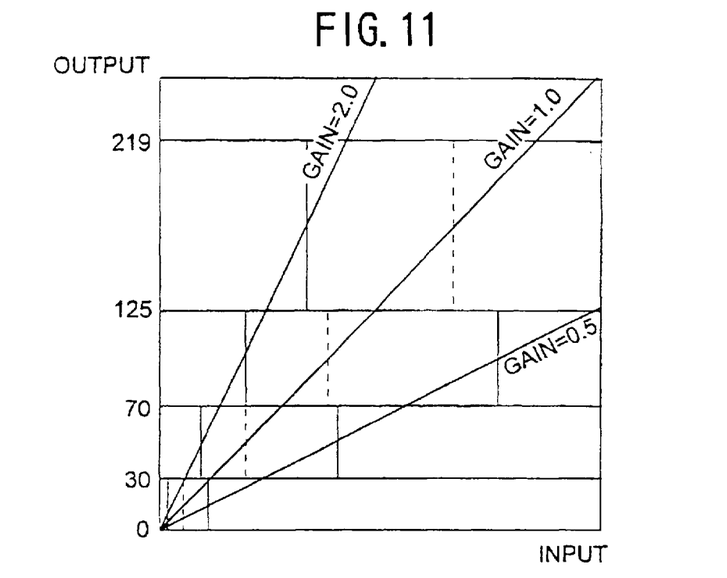
FIG. 11 is a graph showing a quantization characteristic.
Figure 12A:
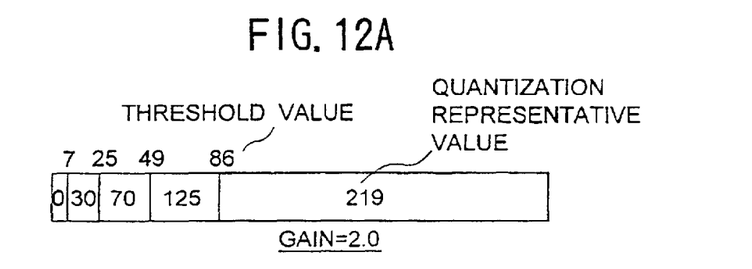
FIG. 12A is an illustration for explaining quantization representative values and ranges defined by threshold values when a gain of a quantizing portion is 2.0.
Figure 12B:
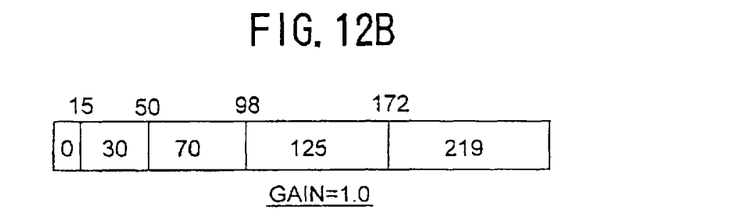
FIG. 12B is an illustration for explaining quantization representative values and ranges defined by threshold values when a gain of a quantizing portion is 1.0.
Figure 12C:
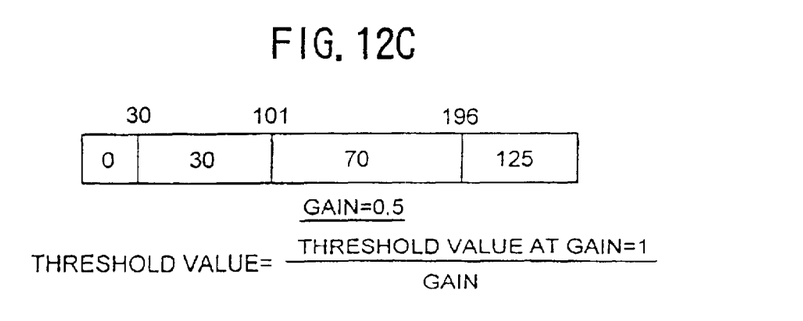
FIG. 12C is an illustration for explaining quantization representative values and ranges defined by threshold values when a gain of a quantizing portion is 0.5.

FIG. 11 is a graph showing a quantizing characteristic of the quantizing portion 1105. Actually, the transform factor takes either a plus value or a minus value. Since the plus and minus values are symmetric, only a plus side is shown in the figure. In the example shown in FIG. 11, 511 values between −255 and 255 are quantized into 9 values, which are, −219, −125, −70, −30, 0, 30, 70, 125, 219. These quantization representative values are compressed by entropy encoding such as the Huffman encoding.

The quantizing portion 1105 determines one of ranges into which an input value falls, the ranges being defined by a plurality of threshold values. Then, the quantizing portion 1105 outputs one of the quantization representative values corresponding to the one of the ranges into which the input value falls.

If the gain of the quantizing portion 1105 is set to 1.0, the quantization representative value lies between the two adjacent threshold values which define the range. For example, in an example shown in FIG. 12B, the quantization representative value 70 is a value between the threshold values 50 and 98. However, if the gain is not 1.0, this condition is not established. That is, in an example shown in FIG. 12A in which the gain is set to 2.0 which is greater than 1.0, the quantization representative value 70 is a value within a range between 25 and 49. On the other hand, in an example shown in FIG. 12C in which the gain is set to 0.5 which is smaller than 1.0, the quantization representative value 70 is assigned to a range between 101 and 196.

If the gain of the quantizing portion 1105 is greater than 1.0, an output of the quantizing portion 1105 is always greater than an input thereof. On the contrary, if the gain of the quantizing portion 1105 is smaller than 1.0, the output of the quantizing portion 1105 is always smaller than the input thereof. The sharpness of change in tone of a block is proportional to the magnitude of the absolute value of the high-frequency factor. Thus, if the gain of the quantization 1105 used for the high-frequency factor is set to a value grater than 1.0, a slope of change in tone of the image restored by a reverse transform becomes steeper. On the contrary, if the gain is set to a value less than 1.0, the slope becomes gentler or smoothed.

If the tone change in the block is sharp, the absolute value of the high-frequency factor is increased.

Figure 13A:
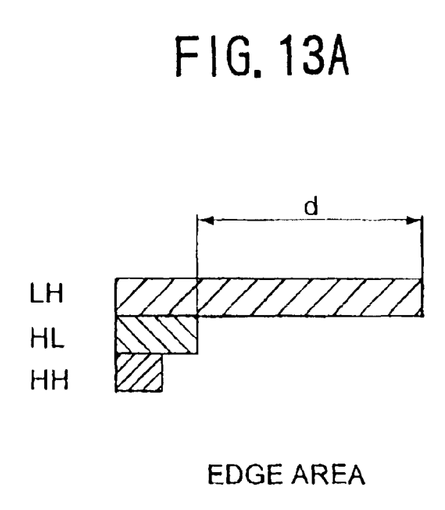
FIG. 13A is an illustration of high-frequency components for an edge area.

The high-frequency factor of an area having a sharp tone change, such as a character image area or a line image area, takes a relatively large value as shown in FIG. 13A. However, the high-frequency factor of an area, in which the tone change is gentle such as a photograph image, takes a relatively small value as shown in FIG. 13B.

Figure 13B:
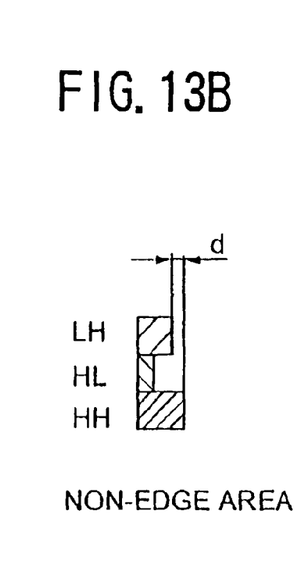
FIG. 13B is an illustration of high-frequency components for a non-edge area.
Figure 13C:
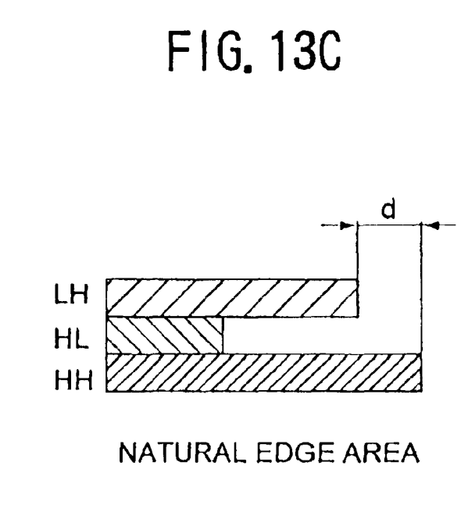
FIG. 13C is an illustration of high-frequency components for an edge area in which two high-frequency components have large values.

Accordingly, the edge degree calculating portion 1108 calculates a difference 'd', shown in each of FIGS. 13A, 13B and 13C, between the largest component and the second largest component among the three high-frequency components LH, HL and HH of the transform factor. The calculated difference 'd' is determined as an edge degree.

If the 4-by-4 pixel matrix block is used, each of the three high-frequency components includes four components. Thus, one of the four components having the maximum absolute value is selected as a representative of the corresponding one of the three high-frequency components. Then, a difference 'd' between the largest representative value and the second largest representative value among the three representative values of the high-frequency components is calculated.

As mentioned above, in an area such as a character image area or a line image area, a differential filtering process is performed so that the tone slope of the contour of the image is increased. On the other hand, in an area such as a photograph image in which the tone slope is gentle, a smoothing filtering process is performed.

In the related art, the filtering process for adjusting an image quality and a quantizing process are performed in different processes. However, in the fifth embodiment, the filtering process is performed in the data compressing process. This is achieved by the gain changing portion 1109 changing the gain of the quantizing portion 1105 in accordance with the edge degree calculated by the edge degree calculating portion 1108. Thereby, the filtering process is performed in the data compressing process. Thus, the process time is reduced and a manufacturing cost of the system can be reduced.

The gain of the quantizing portion 1105 is changed by changing the threshold values thereof. New threshold values are obtained as a result of the threshold values at the gain of 1.0 being divided by a desired gain.

Accordingly, if the desired gain is previously defined by a function of the edge degree, the new threshold values can be obtained sequentially in an order of high-frequency factor→edge degree→gain→new threshold value. Thus, the gain of the quantizing portion 1105 can be changed to the desired gain by using the new threshold values.

When the gain of the quantizing portion 1105 is changed in accordance with a type of image area, there is no need to announce the quantization table used when the encoding is performed to the decoding side since the quantization representative value is fixed, that is, not changed. In the conventional technique such as disclosed in the aforementioned patent document, information with respect to the used quantization table must be stored together with the image data in the compressed data. However, in the fifth embodiment, such information regarding the quantization table is not necessarily stored as compressed data and, thus, the compression rate is increased.

If the information is omitted at a part which is not sensitive to a visual sense of human beings, the compression rate can be increased without substantially changing an image quality. For example, a small tone change adjacent to an area having a sharp tone slope is hardly recognized. This effect is known as a mask effect. According to the mask effect, when a difference between edge degrees of adjacent blocks exceeds a predetermined value, the tone change of the block having the smaller edge degree is hardly recognized.

Accordingly, when a difference between edge degrees of adjacent blocks exceeds a predetermined value, the edge degree calculating portion 1108 changes the smaller edge degree to a further smaller value. As a result, the gain of the quantizing portion 1105 is changed to a smaller value by the gain changing portion 1109 and, thereby, the variance of the quantized values is decreased which result in an increase in the compression rate.

Additionally, in an area in which halftone images or line images are randomly and densely populated, there may be no problem in a visual sense even when the smoothing process is performed. In many cases, a plurality of the high-frequency components of each transform factor of such an area may have large values as shown in FIG. 13C.

In such a case, the edge degree calculating portion 1108 does not set the value of the largest component to the edge degree but sets a difference between the largest component and the second largest component to the edge degree. Thereby, the edge degree is changed to a smaller value. As a result, the gain of the quantizing portion 1105 is changed to a smaller value by the gain changing portion 1109 and, thus, the variance of the quantized values is decreased which results in an increase in a compression rate.

The above-described functions of the image processing unit 1100, shown in FIG. 8, according to the fifth embodiment can be performed by a general-purpose computer that is specially configured by software executed therein to carry out the functions.

The present invention is not limited to the above-described embodiments, and variations and modifications may be made without departing from the scope of the present invention.

The contents of the basic Japanese Patent Application No.9-156008, filed on May 29, 1997, and No.9-156007, filed on May 29, 1997, are hereby incorporated by reference.

What is claimed is:

1. An image processing system comprising:
    dividing means for dividing input image data into a plurality of block data, a block expressed by each of the plurality of block data comprising a pixel matrix of the same predetermined size;
    transform means for transforming each of said plurality of block data using a frequency transform method so as to produce a transform factor;
    quantizing means, having a plurality of quantization tables, for quantizing the transform factor using a first of said plurality of quantization tables;
    encoding means for encoding the output of said quantizing means,
    reverse transform means for restoring image data from the output of said quantizing means; and
    measuring means for measuring an error between the input image data and the image data restored by said reverse transform means,
    wherein said quantizing means quantizes the transform factor a second time using a second of said plurality of quantization tables when the error measured by said measuring means exceeds a predetermined threshold value.

2. The image processing system according to claim 1, wherein said frequency transform method comprises the wavelet transform method.

3. The image processing system according to claim 1, wherein said plurality of quantization tables comprise patterns having different step heights.

4. An image processing system comprising:
    a dividing portion dividing input image data into a plurality of block data, a block expressed by each of said plurality of block data comprising a pixel matrix of the same predetermined size;
    a transform portion transforming each of said plurality of block data using a frequency transform method so as to produce a transform factor;
    a quantizing portion, having a plurality of quantization tables, and quantizing the transform factor using a first of said plurality of quantization tables;
    an encoding portion encoding the output of said quantizing portion;
    a reverse transform portion restoring image data from the output of said quantizing portion; and
    a measuring portion measuring an error between the input image data and the image data restored by said reverse transform portion,
    wherein said quantizing portion quantizes the transform factor a second time using a second of said plurality of quantization tables when the error measured by said measuring portion exceeds a predetermined threshold value.

5. An image processing method comprising the steps of:
    a) dividing input image data into a plurality of block data, a block expressed by each of said plurality of block data comprising a pixel matrix of the same predetermined size;
    b) transforming each of said plurality of block data using a frequency transform method so as to produce a transform factor;
    c) preparing a plurality of quantization tables, and quantizing the transform factor using a first of said plurality of quantization tables;
    d) encoding the output obtained as a result of performing said step c);
    e) restoring image data from the output obtained as a result of performing said step c); and
    f) measuring an error between the input image data and the image data restored in said step e),
    wherein said step c) quantizes the transform factor a second time using a second of said plurality of quantization tables when the error measured in said step f) exceeds a predetermined threshold value.

* * * * *